(12) United States Patent
Yokota

(10) Patent No.: US 7,208,533 B2
(45) Date of Patent: Apr. 24, 2007

(54) COVER COMPOSITION FOR GOLF BALL

(75) Inventor: Masatoshi Yokota, Kobe (JP)

(73) Assignee: SRI Sports Limited, Kobe (JP)

( * ) Notice: Subject to any disclaimer, the term of this patent is extended or adjusted under 35 U.S.C. 154(b) by 295 days.

(21) Appl. No.: 11/017,917

(22) Filed: Dec. 22, 2004

(65) Prior Publication Data

US 2005/0187336 A1   Aug. 25, 2005

(30) Foreign Application Priority Data

Feb. 23, 2004  (JP)  ............................. 2004-046842

(51) Int. Cl.
*A63B 37/12* (2006.01)
*C08L 75/00* (2006.01)
*C08K 3/22* (2006.01)

(52) U.S. Cl. ...................... 523/210; 524/497; 524/589; 524/590; 524/847; 524/874; 473/378

(58) Field of Classification Search ..................... None
See application file for complete search history.

(56) References Cited

U.S. PATENT DOCUMENTS

2002/0086743 A1   7/2002  Bulpett et al.
2003/0232934 A1 *  12/2003  Yokota ........................ 525/452
2004/0018895 A1   1/2004  Bulpett et al.
2005/0192122 A1 *  9/2005  Isogawa et al. ............. 473/378

FOREIGN PATENT DOCUMENTS

JP   2002-159596 A   6/2002

* cited by examiner

*Primary Examiner*—David J. Buttner
(74) *Attorney, Agent, or Firm*—Birch, Stewart, Kolasch and Birch, LLP

(57) ABSTRACT

A cover composition for a golf ball includes: an isocyanate group-terminated urethane prepolymer containing an isocyanate component derived from at least one diisocyanate selected from the group consisting of 4,4'-dicyclohexylmethane diisocyanate, isophorone diisocyanate, and cyclohexane diisocyanate; an aromatic polyamine; a light stabilizer; and a titanium oxide applied with a surface treatment capable of suppressing photocatalytic action of the titanium oxide, wherein the cover composition contains 3 to 8 parts by mass of the surface-treated titanium oxide relative to 100 parts by mass of the urethane prepolymer. The golf ball having the cover composition has superior resistance against discoloration or degradation with time, namely, superior weatherability.

9 Claims, 1 Drawing Sheet

FIG.1A
FIG.1B
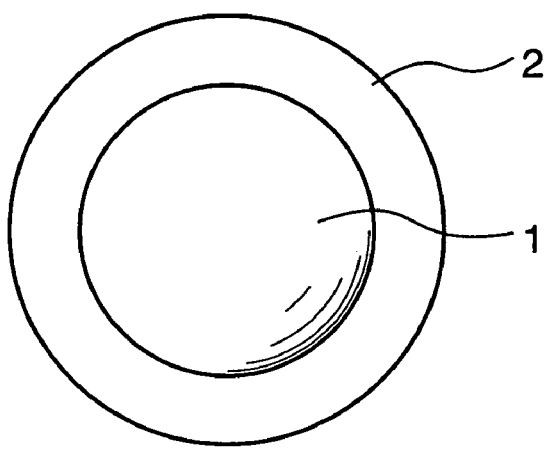
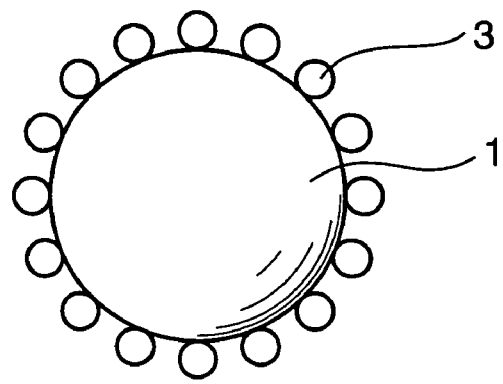

COVER COMPOSITION FOR GOLF BALL

BACKGROUND OF THE INVENTION

1. Field of the Invention

The present invention relates to a cover composition for a golf ball.

2. Description of the Related Art

There has been known, as a cover for a golf ball, balata cover, ionomer cover, and urethane cover. Among these, the urethane cover enjoys prestige in light of the merits that the golf ball having the urethane cover provides good shot feeling and controllability inherent to the balata cover, as well as durability and superior flight performance inherent to the ionomer cover.

The golf ball having the urethane cover, however, is likely to cause discoloration such as yellow discoloration with time, because it is used outdoors. This is because the urethane composing the cover is exposed to UV rays of the sunlight, and resultantly degraded.

There is known a method of using an aliphatic/alicyclic polyisocyanate having good weatherability as a raw material for the urethane cover to keep the urethane cover from causing yellow discoloration.

Japanese Unexamined Patent Publication No. 2002-159596 discloses that a urethane composition for a cover contains a color stabilizer such as a UV absorber and a light stabilizer.

Use of the aliphatic/alicyclic polyisocyanate as a material for the urethane cover enables to improve weatherability, as compared with a case of using an aromatic polyisocyanate. However, the effect by use of this component is not sufficient because the polyurethane cover causes yellow discoloration not only due to degradation of the urethane by exposure to UV rays but also due to degradation of the urethane arising from photocatalytic action of titanium oxide. Such titanium oxide is generally contained in the cover composition as a white pigment for providing whiteness to the golf ball.

Specifically, by exposure to UV rays, an electron-hole pair consisting of a free electron ($e^-$) on a conduction band and a positive hole ($p^+$) on a valence electron band is generated in the titanium oxide due to excitation of the electron on the valence electron band, as represented by the following formula (1).

$$TiO_2 + h_r \rightarrow p^+ + e^- \qquad (1)$$

The positive hole ($p^+$) is entrapped by $OH^-$ in adsorbed water on the surface of the titanium oxide, thereby generating an OH free radical, as represented by the formula (3). The generated free radical decomposes a resin component of the urethane cover by its powerful oxidizing action.

$$H_2O \rightarrow H^+ + OH^- \qquad (2)$$

$$OH^- + p^+ \rightarrow \dot{O}H \qquad (3)$$

The free electron ($e^-$) reduces $Ti^{4+}$ in a crystal of the titanium oxide to $Ti^{3+}$ as represented by the formula (4). Subsequently, $O_2$ in the air is adsorbed to the $Ti^{3+}$, and turns to $O^-_2$ as represented by the formula (5). Then, the $O^-_2$ is reacted with the $H^+$ in the formula (2), and turns to an $\dot{H}O_2$ free radical while undergoing the reaction as represented by the formula (6). Similarly to the OH free radical, the $\dot{H}O_2$ free radical decomposes the resin component of the urethane cover around the titanium oxide by its powerful oxidizing action.

$$[Ti^{4+}] + e^- \rightarrow [Ti^{3+}] \qquad (4)$$

$$[Ti^{3+}] + O_2 \rightarrow [Ti^{4+}] + O^-_2 \qquad (5)$$

$$O^-_2 + H^+ \rightarrow \dot{H}O_2 \qquad (6)$$

As mentioned above, there is a drawback that weatherability of the cover cannot be improved sufficiently, as far as the cover composition contains titanium oxide, despite inclusion of a color stabilizer such as a UV absorber and a light stabilizer, as disclosed in the above publication.

SUMMARY OF THE INVENTION

In view of the problems residing in the prior art, an object of the present invention is to provide a cover composition for a golf ball that enables to produce a golf ball having superior resistance against discoloration or degradation with time, namely, superior weatherability, despite inclusion of titanium oxide.

According to an aspect of the present invention, a cover composition for a golf ball comprises: an isocyanate group-terminated urethane prepolymer containing an isocyanate component derived from at least one diisocyanate compound selected from the group consisting of 4,4'-dicyclohexylmethane diisocyanate, isophorone diisocyanate, and cyclohexane diisocyanate; an aromatic polyamine; a light stabilizer; and a titanium oxide applied with a surface treatment capable of suppressing photocatalytic action of the titanium oxide, wherein the cover composition contains 3 to 8 parts by mass of the surface-treated titanium oxide relative to 100 parts by mass of the urethane prepolymer. Weatherability of the cover, which may be degraded by photocatalytic action of titanium oxide, can be improved by applying the surface treatment onto the titanium oxide. Further, UV absorbability of the titanium oxide can be effectively obtained by setting the content ratio of the ingredients of the cover composition as defined above.

These and other objects, features and advantages of the present invention will become more apparent upon reading of the following detailed description along with the accompanying drawings.

BRIEF DESCRIPTION OF THE DRAWINGS

FIGS. 1A and 1B are illustrations showing examples of a titanium oxide applied with a surface treatment for suppressing photocatalytic action of the titanium oxide.

DETAILED DESCRIPTION OF THE PREFERRED EMBODIMENTS OF THE INVENTION

A feature of a cover composition for a golf ball according to embodiments of the present invention resides in that: the cover composition contains an isocyanate group-terminated urethane prepolymer containing an isocyanate component derived from at least one diisocyanate compound selected from the group consisting of 4,4'-dicyclohexylmethane diisocyanate, isophorone diisocyanate, and cyclohexane diisocyanate; an aromatic polyamine; a light stabilizer; and a titanium oxide applied with a surface treatment capable of suppressing photocatalytic action of the titanium oxide.

First, the titanium oxide applied with the surface treatment capable of suppressing the photocatalytic action of the titanium oxide is described.

The titanium oxide (hereinafter, called as "surface-treated titanium oxide") applied with the surface treatment for suppressing the photocatalytic action of the titanium oxide is used in the cover composition of the present invention.

Examples of the surface-treated titanium oxide are the ones in which an oxide of aluminum, silicon, zinc, zirconium, tin, cerium, and antimony, or a hydrate thereof is formed on the surface of the titanium oxide. Exemplified manners as to how the surface treatment is applied are the one (see FIG. 1A) in which a surface-treated layer 2 containing the above component is formed on the particle surface of the titanium oxide 1, and the one (see FIG. 1B) in which fine particles 3 containing the above component are adhered on the particle surface of the titanium oxide. Both of the surface-treated titanium oxides which have been applied with a surface treatment at a content capable of suppressing photocatalytic action of the titanium oxide are applicable to the present invention because both of the surface-treated titanium oxides provide a resultant golf ball with an improved weatherability for the following reasons.

It is conceived that the surface-treated titanium oxide exhibits an improved weatherability for the following reasons. An ȮH free radical generated by exposure of the titanium oxide to UV rays has a powerful oxidizing action. The ȮH free radical is unstable, has a short life, and decomposes as represented by the following formula (7).

$$2\dot{O}H \rightarrow H_2O + O_2 \quad (7)$$

If the aforementioned oxide layer or hydrate layer is formed on the surface of the titanium oxide, the decomposition as represented by the formula (7) is progressed by a catalytic action of the oxide layer or the hydrate layer while the ȮH free radicals pass through these layers. As a result, the quantity of free radicals involved in oxidative decomposition of the resin component of the urethane cover is reduced, which resultantly suppresses degradation of the cover.

The metal in the cover composition of the embodiments of the present invention is used to provide the titanium oxide with photostability. Use of the metal also contributes to suppression of the photocatalytic action of the titanium oxide, thereby improving weatherability of the cover.

It is preferable, in the embodiments of the present invention, that at least one selected from the group consisting of silicon oxide, zirconium oxide, aluminum oxide, and hydrates thereof is formed on the particle surface of the titanium oxide. Examples of the surface-treated titanium oxide include "D-918" (surface treatment with $SiO_2.H_2O$, $SrO_2.H_2O$, $Al_2O_3.H_2O$), "STR60C" (surface treatment with Al), "STR60S" (surface treatment with Ce/Sn/Zn/Al), and "STR100A-L" (surface treatment with Si/Al). All the products under the above trade names are produced by Sakai Chemical Industry Co., Ltd.

The cover composition in the embodiments of the present invention contains the surface-treated titanium oxide in the content of 3 parts by mass or more, preferably, 4 parts by mass or more relative to 100 parts by mass of a urethane prepolymer, which is a base resin for the cover. The titanium oxide has UV absorbability, in addition to a function as a white pigment. As mentioned above, the cover is degraded or causes yellow discoloration with time because the urethane composing the cover is decomposed by exposure to the sunlight, particularly, UV rays of the sunlight. In view of this, the decomposition of the resin component of the cover can be prevented by decreasing the quantity of UV rays which may act on the resin component by addition of the surface-treated titanium oxide. If the content of the surface-treated titanium oxide is lower than the above lower limit, it is highly likely that good weatherability may not be obtained. Further, the cover composition contains the surface-treated titanium oxide in the content of 8 parts by mass or less, preferably, 6 parts by mass or less relative to 100 parts by mass of the urethane prepolymer. If the content of the surface-treated titanium oxide exceeds the above upper limit, it may be difficult to obtain the expected effect despite the addition of the surface-treated titanium oxide in such a large amount, because the effect is saturated. In view of this, setting the content of the surface-treated titanium oxide in the above range enables to secure hardness of the cover despite formation of the cover of a small thickness, while suppressing lowering of durability of the cover, as the thickness of the cover is reduced.

It is preferable to disperse particles of the surface-treated titanium oxide in the cover composition to allow the surface-treated titanium oxide to exhibit the function as a white pigment and to effectively exhibit the UV absorbability. It is, however, difficult to disperse the surface-treated titanium oxide in the cover composition in a powdery state. In view of this, it is preferable to prepare a dispersant in which the surface-treated titanium oxide is dispersed and to add the mixture to the cover composition. A preferred example of the dispersant is the one having superior compatibility with the urethane prepolymer, which will be described later. It is preferable to use polyether polyols such as polyoxyethylene glycol (PEG), polyoxypropylene glycol (PPG), and polyoxytetramethylene glycol (PTMG) as the dispersant.

Next, the isocyanate group-terminated urethane prepolymer, which is contained in the cover composition in the embodiments of the present invention, is described. The isocyanate group-terminated urethane prepolymer used in the embodiments of the present invention contains an isocyanate component derived from at least one diisocyanate compound selected from the group consisting of 4,4'-dicyclohexylmethane diisocyanate, isophorone diisocyanate, and cyclohexane diisocyanate. As far as the urethane prepolymer has two or more isocyanate groups in a molecular chain thereof, the kind of the urethane prepolymer is not specifically limited. The isocyanate group may be bonded to an end of a main chain of the urethane prepolymer, or may be bonded to an end of a side chain thereof, if the urethane prepolymer has the side chain. In the embodiments of the present invention, at least one diisocyanate compound selected from the group consisting of 4,4'-dicyclohexylmethane diisocyanate, isophorone diisocyanate, and cyclohexane diisocyanate is used to form the isocyanate component of the urethane prepolymer, because these diisocyanates are alicyclic diisocyanates, and accordingly, do not cause yellow discoloration, unlike a case of using an aromatic polyisocyanate. Among these alicyclic diisocyanates, 4,4'-dicyclohexylmethane diisocyanate is a particularly preferred isocyanate compound, because use of the 4,4'-dicyclohexylmethane diisocyanate as the isocyanate component enables to produce a polyurethane cover having superior repulsion performance.

The kind of the isocyanate group-terminated urethane prepolymer is not specifically limited, as far as the urethane prepolymer contains a polyol component. The urethane prepolymer can be produced by reacting at least one selected from the group consisting of 4,4'-dicyclohexylmethane diisocyanate, isophorone diisocyanate, and cyclohexane diisocyanate with the polyol as exemplified in the following in a condition that the number of moles of isocyanate groups in the polyisocyanate is larger than that of hydroxyl groups in the polyol.

The kind of the polyol is not specifically limited, as far as the polyol has plural hydroxyl groups. Examples of the polyol are a polyol having a low molecular weight, and a polyol having a large molecular weight. Examples of the polyol having a low molecular weight include diols such as ethylene glycol, diethylene glycol, triethylene glycol, 1,3-butanediol, 1,4-butanediol, neopentyl glycol, and 1,6-hexanediol; and triols such as glycerin, trimethylolpropane, and hexanetriol.

Examples of the polyol having a large molecular weight are polyether polyols such as polyoxyethylene glycol (PEG), polyoxypropylene glycol (PPG), and polyoxytetramethylene glycol (PTMG); condensed polyester polyols such as polyethylene adipate (PEA), polybutylene adipate (PBA), and polyhexamethylene adipate (PHMA); lactone polyester polyols such as poly-ε-caprolactone (PCL); polycarbonate polyols such as polyhexamethylene carbonate; and acrylic polyol. Among these polyols, preferred are polyols having a weight-average molecular weight from 50 to 2,000, and particularly preferred are polyols having a weight-average molecular weight from about 100 to 1,000. One or more than one of these polyols may be mixed.

It is preferable to use polyether polyol, more preferably, polyoxytetramethylene glycol (PTMG) as the polyol component of the isocyanate group-terminated urethane prepolymer. This is because using the above component provides a resultant polyurethane cover with superior repulsion performance and water resistance.

Next, the aromatic polyamine to be contained in the cover composition of the present invention is described.

As described above, according to the embodiments of the present invention, it is preferable to use, as an isocyanate component, at least one diisocyanate selected from the group consisting of 4,4'-dicyclohexylmethane diisocyanate, isophorone diisocyanate, and cyclohexane diisocyanate. It is preferable to use an aromatic polyamine such as a 4,4'-diamino diphenylmethane derivative and a phenylene diamine derivative together with these isocyanate components, because the aromatic polyamine has proper reactivity with these polyisocyanates. Further, use of the 4,4'-diamino diphenylmethane derivative improves durability of a resultant cover, and use of the phenylene diamine derivative improves flight performance of a resultant golf ball. It is preferable to use the phenylene diamine derivative in light of the merit that it is available as a liquid, and is easily handled.

Preferred examples of the 4,4'-diamino diphenylmethane derivative are alkyl-substituted 4,4'-diaminodiphenylmethane derivatives such as dialkyl-substituted 4,4'-diaminodiphenylmethane, and tetraalkyl-substituted 4,4'-diaminodiphenylmethane. Particularly, the 4,4'-diamino diphenylmethane derivative having 1 to 3 carbon atoms in the alkyl group are preferred. This is because the larger the number of carbon atoms in the alkyl group, the lower the reactivity of the derivative with an isocyanate group is. Examples of the 4,4'-diaminodiphenylmethane derivative include, in addition to 4,4'-diaminodiphenylmethane, alkyl-substituted 4,4'-diaminodiphenylmethanes such as 2,2'-dimethyl-4,4'-diaminodiphenylmethane, 3,3'-dimethyl-4,4'-diaminodiphenylmethane, 3,3',5,5'-tetramethyl-4,4'-diaminodiphenylmethane, 2,2'-diethyl-4,4'-diaminodiphenylmethane, 3,3'-diethyl-4,4'-diaminodiphenylmethane, 3,3',5,5'-tetraethyl-4,4'-diaminodiphenylmethane, 2,2'-dipropyl-4,4'-diaminodiphenylmethane, 3,3'-dipropyl-4,4'-diaminodiphenylmethane, 3,3',5,5'-tetrapropyl-4,4'-diaminodiphenylmethane, and 3,3'-diethyl-5-5'-dimethyl-4,4'-diaminodiphenylmethane. Among these, 3,3',5,5'-tetraalkyl-4,4'-diaminodiphenylmethane is preferred, and 3,3'-diethyl-5,5'-dimethyl-4,4'-diaminodiphenylmethane is more preferred.

Examples of the phenylene diamine derivative include, in addition to phenylene diamine, monoalkyl phenylenediamine derivatives, dialkyl phenylenediamine derivatives, trialkyl phenylenediamine derivatives, and tetraalkyl phenylenediamine derivatives. Preferred phenylenediamine derivatives are dialkyl phenylenediamine derivatives, trialkyl phenylenediamine derivatives, and tetraalkyl phenylenediamine derivatives. Use of these phenylenediamine derivatives is advantageous because the reactivity of the derivatives with an isocyanate group can be controlled by selecting the alkyl group or the number of substituents.

The bonding position of the amino group in the phenylenediamine derivative is not specifically limited. Examples of the phenylenediamine derivative include 1,3-phenylenediamine (m-phenylenediamine) derivatives, 1,4-phenylenediamine (p-phenylenediamine) derivatives, and 1,2-phenylenediamine (o-phenylenediamine) derivatives. Among these phenylene diamine derivatives, 1,3-phenylenediamine (m-phenylenediamine) derivatives, dialkyl derivatives, trialkyl derivatives, and tetraalkyl derivatives thereof are preferred. 1,3-phenylenediamine derivative is preferred because its reactivity with an isocyanate group can be controlled easily depending on the substituent at 2-position, 4-position, or 6-position of the 1,3-phenylenediamine derivative.

Examples of the 1,3-phenylediamine derivative include 2,4,6-trimethyl-1,3-phenylenediamine, 2,4,6-triethyl-1,3-phenylenediamine, 2,4,6-tripropyl-1,3-phenylenediamine, 2,4-diethyl-6-methyl-1,3-phenylenediamine, 2,4-dipropyl-6-methyl-1,3-phenylenediamine, 2,4-dimethyl-6-ethyl-1,3-phenylenediamine, 2,4-dipropyl-6-ethyl-1,3-phenylenediamine, 2,4-dimethyl-6-propyl-1,3-phenylenediamine, 2-4-diethyl-6-propyl-1,3-phenylenediamine, 4,6-diethyl-2-methyl-1,3-phenylenediamine, 4,6-dipropyl-2-methyl-1,3-phenylenediamine, 4,6-dimethyl-2-ethyl-1,3-phenylendiamine, 4,6-dipropyl-2-ethyl-1,3-phenylenediamine, 4,6-dimethyl-2-propyl-1,3-phenylenediamine, 4-6-diethyl-2-propyl-1,3-phenylenediamine, 2,6-diethyl-4-methyl-1,3-phenylenediamine, 2,6-dipropyl-4-methyl-1,3-phenylendiamine, 2,6-dimethyl-4-ethyl-1,3-phenylenediamine, 2,6-dipropyl-4-ethyl-1,3-phenylenediamine, 2,6-dimethyl-4-propyl-1,3-phenylenediamine, and 2,6-diethyl-4-propyl-1,3-phenylenediamine. A preferred example of the phenylenediamine derivative is a commercially available product under the trade name "Ethacure 100LC", produced by Albemarle Corp. The product is substantially colorless and makes it possible to provide high brightness of a golf ball at an initial stage of use.

The content ratio of the polyamine compound to the urethane prepolymer in the cover composition of the embodiments of the present invention is preferably 0.70 or more, more preferably 0.80 or more, and furthermore preferably 0.85 or more, and preferably 1.20 or less, more preferably 1.05 or less, and furthermore preferably 1.00 or less in terms of molar ratio of amino group to isocyanate group ($NH_2$/NCO). If the content ratio is lower than 0.70, the content of the urethane prepolymer is excessive, compared to the polyamine compound, which is likely to provoke excessive reaction of producing allophanate and burette. As a result of such a reaction, produced polyurethane tends to have insufficient flexibility. On the other hand, if the content ratio exceeds 1.20, the content of isocyanate groups is not sufficient. Consequently, cross-linking reaction of generating allophanate and burette is hindered, and the number of three-dimensional cross-linking points is reduced. As a result, produced polyurethane tends to have insufficient strength.

Adding a light stabilizer in the cover composition of the embodiments of the present invention makes it possible to further improve weatherability of the cover. A preferred example of the light stabilizer is a hindered amine light stabilizer (HALS) having a structure as represented by the formula (8), wherein all the hydrogen atoms on the carbon atoms at 2-position and 6-position of piperidine are substituted by a methyl group. A particularly preferred example of the light stabilizer is a tertiary amine carrying no active hydrogen, because the tertiary amine carrying no active hydrogen is less likely to react with an isocyanate group of the urethane prepolymer.

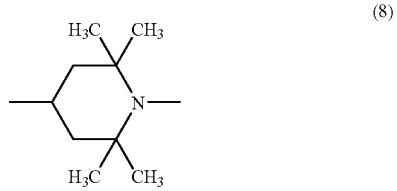

(8)

Examples of the tertiary hindered amine light stabilizer having the structure as represented by the formula (8) include methyl(1,2,2,6,6-pentamethyl-4-piperidyl)sebacate, bis(1,2,2,6,6-pentamethyl-4-piperidyl)oxalate, bis(1,2,2,6,6-pentamethyl-4-piperidyl)malonate, bis(1,2,2,6,6-pentamethyl-4-piperidyl)adipate, bis(1,2,2,6,6-pentamethyl-4-piperidyl)terephthalate, bis(1,2,2,6,6-pentamethyl-4-piperidyl)sebacate, and bis(1-octyloxy-2,2,6,6-tetramethyl-4-piperidyl)sebacate. Among these, bis(1,2,2,6,6-pentamethyl-4-piperidyl)sebacate is preferred because it is available as a liquid at normal temperature, easily dissolvable in an organic solvent, and shows superior compatibility with a urethane resin.

The content ratio of the light stabilizer to the urethane prepolymer is preferably 0.1 part by mass or more, more preferably 0.2 part by mass or more, and furthermore preferably 0.3 part by mass or more, and preferably 1.0 part by mass or less, more preferably, 0.9 part by mass or less, and furthermore preferably 0.7 part by mass or less relative to 100 parts by mass of the urethane prepolymer. If the content ratio is lower than the lower limit, sufficient effect by addition of the light stabilizer is not obtainable. On the other hand, if the content ratio exceeds the upper limit, the excessive addition of the light stabilizer not only raises the production cost but also may lower durability of the cover.

The cover composition of the embodiments of the present invention may contain a well-known catalyst used in polyurethane reaction, in addition to the isocyanate group-terminated urethane prepolymer, the aromatic polyamine, the surface-treated titanium oxide, and the light stabilizer. Examples of the catalyst include monoamines such as triethylamine, and N-N-dimethylcyclohexylamine; polyamines such as N,N,N',N'-tetramethylethylenediamine, and N,N,N',N'',N''-pentamethyldiethylenetriamine; cyclic diamines such as 1,8-diazabicyclo[5,4,0]-7-undecene (DBU), and triethylenediamine; and tin-based catalysts such as dibutyl tin dilaurylate, and dibutyl tin diacetate. Further, it may be possible to add a filler such as barium sulfate; a colorant; and an additive such as a dispersant, an antioxidant, a UV absorber, a fluorescent material, and a fluorescent whitening agent, according to needs, as long as inclusion of these components do not impair a desired property of the polyurethane cover.

Generally, it is preferable to set a curing temperature ranging from normal temperature to 140° C., and a curing time ranging from about 1 to 60 minutes as curing conditions for the cover composition, depending on the kind of the urethane prepolymer and the aromatic polyamine to be used. Curing the cover composition in the above conditions enables to produce a cured product suitable as a cover material with less influence to a rubber molded product produced at the time of forming the cover, and with good productivity and operability.

It is desirable to set the thickness of the cover to 0.2 mm or larger, preferably 0.3 mm or larger, and 1.5 mm or smaller, preferably 1.3 mm or smaller in using the cured product of the cover composition as a cover material for a golf ball. Setting the thickness of the cover not larger than the thickness of a conventional cover, e.g., 1.5 mm makes it possible to prevent lowering of repulsion force of a golf ball arising from a relatively soft polyurethane cover. On the other hand, if the cover thickness is less than 0.2 mm, it is difficult to produce a golf ball with such a thin cover. Even if a golf ball having such a thin cover is produced, the tearing strength of the cover is lowered, and the golf ball is likely to be damaged due to an impact or friction exerted thereon against the face of a golf club at the time of hitting the ball or other factor. In a worst case, the solid core of the golf ball may be exposed.

The structure of the golf ball to which the inventive cover composition is applicable is not specifically limited. Examples of the golf ball are a two-piece golf ball comprising a solid core and a cover made of the aforementioned cover material for covering the solid core, a multi-piece golf ball comprising a solid core and a cover made of the cover material, and a thread-wound golf ball. The solid core may have a single-layered structure, or a multi-layered structure including a center core and at least one intermediate layer for covering the center core. The kind of the center core of the single-layered solid core or the multi-layered solid core is not specifically limited. However, preferably, the center core may be a vulcanized product made of a rubber composition containing diene rubber as a base rubber, a co-crosslinking agent, and a crosslinking initiator.

A preferred example of the diene rubber is high cis polybutadiene having cis bond of 40% or more, preferably 70% or more, and furthermore preferably 90% or more. The cis bond is advantageous in providing the resultant golf ball with good repulsion force. Examples of the co-crosslinking agent are α, β-unsaturated carboxylic acids having 3 to 8 carbon atoms or a metal salt thereof, preferably, acrylic acid, methacrylic acid or a metal salt thereof. Examples of the metal in the metal salts are preferably zinc, magnesium, calcium, aluminum, and sodium, and more preferably zinc. It is preferable to add 20 to 50 parts by mass of the co-crosslinking agent relative to 100 parts by mass of the base rubber. Examples of the crosslinking initiator are organic peroxides such as dicumyl peroxide, 1,1-bis(t-butylperoxy)-3,5-trimethylcyclohexane, 2,5-dimethyl-2,5-di(t-butylperoxy)hexane, and di-t-butyl peroxide. A preferred crosslinking initiator is dicumyl peroxide. The content of the crosslinking initiator is preferably 0.2 part by mass or more, more preferably 0.3 part by mass or more, and preferably 1.5 parts by mass or less, and more preferably 1.0 part by mass or less relative to 100 parts by mass of the base rubber.

It is preferable to add an organic sulfur compound to raise the repulsion force of the resultant golf ball, in addition to the base rubber, the co-crosslinking agent, and the crosslinking initiator. Examples of the organic sulfur compound are diphenyl disulfide derivatives such as diphenyldisulfide and dipentachloro diphenyldisulfide. Further, it may be possible to add a specific gravity adjuster such as zinc oxide and barium sulfate, an anti-oxidant, a colored powder, and the like to the rubber composition, according to needs.

The single-layered solid core or the center core is produced by molding the rubber composition into a spherical shape by heat press molding. The heating condition is optionally set depending on the ingredients of the rubber composition. Generally, it is preferable to heat the rubber composition at a temperature ranging from 130 to 200° C. for 10 to 60 minutes, or to heat the rubber composition in two steps, namely, heating at a temperature ranging from 130 to 150° C. for 20 to 40 minutes, followed by heating at a temperature ranging from 160 to 180° C. for 5 to 15 minutes.

In the case where the solid core has a multi-layered structure, the kind of the intermediate layer corresponding to at least one layer for covering the center core is not specifically limited. However, preferably, the intermediate layer may be a molded product of a rubber composition or a thermoplastic resin product. In the case where the molded product of a rubber composition is used as the intermediate layer, the same rubber composition as used in producing the center core is usable. In the case where a thermoplastic resin is used for forming the intermediate layer, ionomer resins such as Himilan® produced by Mitsui-Dupont Polychemicals Co., Ltd., Surlin® produced by DuPont Corp., and IOTECH® produced by Exxon Corp, polyester elastomers such as Hytrel® produced by DuPont-Toray Co., Ltd., polyurethane elastomers such as Elastolan® produced by BASF, polystyrene elastomers such as septon® produced by Kuraray Co., Ltd., and polyamide elastomers such as Pebax® are usable. It is preferable to use the ionomer resin as the thermoplastic resin for forming the intermediate layer in light of the merits that the ionomer resin provides superior repulsion force and durability. Examples of the ionomer resin are a resin produced by neutralizing a two-component copolymer consisting of olefin and unsaturated carboxylic acid by metal ions, and a resin produced by neutralizing a three-component copolymer consisting of olefin, unsaturated carboxylic acid, and unsaturated carboxylic acid ester by metal ions. Alternatively, these ionomer resins may be mixed together to provide the resultant golf ball with desired elasticity and rigidity. Examples of the metal used for neutralization include alkali metals such as sodium and lithium, alkali earth metals such as magnesium and calcium, and bivalent transition metals such as zinc and copper.

It may be possible to add a colorant, a filler such as barium sulfate, and an additive such as an anti-oxidant, a UV absorber, and a fluorescent whitening agent, as an ingredient for forming the intermediate layer, in addition to the rubber composition and the thermoplastic resin as a base material. The method for covering the center core with the intermediate layer is not specifically limited. However, in case of using the thermoplastic resin, the intermediate layer of the thermoplastic resin is formed around the center core by an injection molding or a compression molding. In case of using the rubber composition, the center core is covered with an un-vulcanized rubber composition, followed by vulcanization.

In case of a thread wound golf ball, a thread wound core is used. The thread wound core comprises a center core, and a rubber thread layer produced by winding rubber thread in a stretched state around the center core. A conventional thread wound core is usable. The center core may be produced by using a liquid (in this case, a liquid center core is formed), or by using a rubber (in this case, a solid center core is formed). The rubber thread to be wound around the center core may be made of the same material as used in a thread wound layer of a conventional thread wound golf ball. For instance, the rubber thread may be produced by vulcanizing a rubber composition containing a natural rubber or a synthetic rubber, and a synthetic polyisoprene, with addition of sulfur, a vulcanization auxiliary, a vulcanization accelerator, an anti-oxidant, or the like. The thread wound core is fabricated by winding the rubber thread around the center core while stretching the rubber thread by about 10 times relative to its original length.

It is desirable that a golf ball formed with a cover made of a cured product of the inventive cover composition has a deformation of 2.20 mm or larger, preferably 2.30 mm or larger, and 3.50 mm or less, preferably 3.30 mm or less when a load ranging from 98N (10 kgf) as an initial load to 1275N (130 kgf) as a final load is applied to the golf ball. If the deformation is less than 2.20 mm, the resultant golf ball has an excessive hardness, and gives a player poor shot feeling. On the other hand, if the deformation exceeds 3.50 mm, the golf ball is too soft, with the result that a repulsion force of the ball is lowered, and a player feels the ball heavy at hitting.

It may be possible to coat paint or print a stamp or a like mark on the cover surface of the golf ball in order to provide the golf ball with sophisticated appearance and to improve the commercial value of the golf ball.

EXAMPLES

In the following, the present invention is illustrated in detail with Examples, which however, do not limit the invention. Adequate modification is allowable as far as it does not depart from the object of the present invention described above or below, and every such modification is intended to be embraced in the technical scope of the present invention.

[Evaluation Method]

(1) Weatherability

A weatherability test (JIS-D0205) was conducted by irradiation of light onto golf balls for 60 hours in a chamber of a temperature at 63° C., humidity of 50%, with showers of rain for 12 minutes in every 60 minutes, using a Sunshine Super Long Life Weather Meter "WEL-SUN-HC/B" manufactured by Suga Test Instruments Co., Ltd. The color tone (L value, a value, b value) of each golf ball at the same position before and after the irradiation was measured with use of a colorimeter "CR-221" manufactured by Konica Minolta Co., Ltd. Differences in L value, a value, and b value (namely, $\Delta L$, $\Delta a$, $\Delta b$) between before and after the irradiation were obtained, and $\Delta E$ was calculated by implementing the following equation. The value $\Delta E$ represents a degree of discoloration. The larger the $\Delta E$ is, the greater the degree of discoloration is. Further, a large degree of discoloration implies that a degree of degradation of a resin component of the coat of the golf ball is large.

$$\Delta E = [(\Delta L)^2 + (\Delta a)^2 + (\Delta b)^2]^{1/2}$$

[Production of Golf Ball]

(1) Production of Solid Core

Spherical solid cores each having a diameter of 41.1 mm and a weight of 40.5 g were produced by subjecting the rubber composition as shown in Table 1 to heat compression molding at 170° C. for 20 minutes.

TABLE 1

| rubber composition (unit: parts by mass) | |
|---|---|
| BR-18 | 100 |
| zinc acrylate | 33 |
| zinc oxide | 12 |
| diphenyl disulfide | 0.5 |
| dicumyl peroxide | 0.5 |

More specifically, the rubber composition contains the following ingredients:

High cis polybutadiene BR-18 manufactured by JSR Corporation (content of cis 1,4-bond: 96%) as butadiene rubber;

"ZNDA-90S" manufactured by Nippon Jhoryu as zinc acrylate;

"Ginrei R" manufactured by Toho Zinc Co., Ltd. as zinc oxide; diphenyl disulfide manufactured by Sumitomo Seika Chemicals Co., Ltd.; and dicumyl peroxide manufactured by NOF Corporation.

(2) Production of Cover

Two-piece golf balls each having a diameter of 42.7 mm were produced by forming a cover made of the cover composition as shown in Table 2 onto the aforementioned solid core.

TABLE 2

| | | | Ball No. | | | | | | |
|---|---|---|---|---|---|---|---|---|---|
| | | | 1 | 2 | 3 | 4 | 5 | 6 | 7 |
| cover composition (parts by mass) | Pre polymer | Adiprene LW520 | 100 | 100 | 100 | 100 | 100 | 100 | 100 |
| | | Vibrathane B635 | — | — | — | — | — | — | — |
| | | Adiprene LF950A | — | — | — | — | — | — | — |
| | Curing agent | Ethacure 100LC | 9.7 | 9.7 | 9.7 | 9.7 | 9.7 | 9.7 | 9.7 |
| | | Ethacure 300 | — | — | — | — | — | — | — |
| | | Curehard MED | — | — | — | — | — | — | — |
| | | Colorant (titanium oxide in colorant) | 2.0 (1) | 4.0 (2) | 6.0 (3) | 10.0 (5) | 10.0 (5) | 10.0 (5) | 10.0 (5) |
| | | Light stabilizer | 0.5 | 0.5 | 0.5 | 0.0 | 0.5 | 1.0 | 1.5 |
| cover properties | Initial evaluation | Wcie | 91.4 | 91.6 | 91.9 | 92.6 | 92.6 | 92.6 | 92.6 |
| | | L | 83.8 | 84.1 | 85.6 | 86.1 | 86.1 | 86.1 | 86.1 |
| | | a | −0.3 | −0.4 | −0.4 | −0.3 | −0.3 | −0.3 | −0.3 |
| | | b | −5.1 | −4.9 | −5.0 | −5.0 | −5.0 | −5.0 | −5.0 |
| | Evaluation after weatherability test | Wcie | 24.8 | 56.2 | 75.8 | 42.8 | 83.8 | 84.3 | 84.3 |
| | | L | 81.5 | 83.2 | 84.8 | 83.3 | 86.0 | 85.8 | 85.9 |
| | | a | −2.2 | −1.9 | −1.2 | −1.2 | −1.0 | −0.9 | −1.0 |
| | | b | 10.2 | 5.8 | −0.8 | 4.3 | −3.1 | −3.3 | −3.2 |
| | | Discoloration after test (ΔE) | 15.6 | 10.8 | 4.3 | 9.8 | 2.0 | 1.8 | 1.9 |

| | | | Ball No. | | | | | |
|---|---|---|---|---|---|---|---|---|
| | | | 8 | 9 | 10 | 11 | 12 | 13 |
| cover composition (parts by mass) | Pre polymer | Adiprene LW520 | 100 | 100 | 100 | — | — | 100 |
| | | Vibrathane B635 | — | — | — | 100 | — | — |
| | | Adiprene LF950A | — | — | — | — | 100 | — |
| | Curing agent | Ethacure 100LC | 9.7 | 9.7 | — | — | — | 9.7 |
| | | Ethacure 300 | — | — | — | 14.6 | 18.5 | — |
| | | Curehard MED | — | — | 15.3 | — | — | — |
| | | Colorant (titanium oxide in colorant) | 16.0 (8) | 20.0 (10) | 10.0 (5) | 10.0 (5) | 10.0 (5) | 10.0 (5)* |
| | | Light stabilizer | 0.5 | 0.5 | 0.5 | 0.5 | 0.5 | 0.5 |
| cover properties | Initial evaluation | Wcie | 93.1 | 93.5 | 80.5 | 75.0 | 74.5 | 92.6 |
| | | L | 86.4 | 86.4 | 82.3 | 88.9 | 82.4 | 86.1 |
| | | a | −0.2 | −0.2 | −1.5 | −0.6 | −1.7 | −0.3 |
| | | b | −4.6 | −4.7 | −3.0 | −10.9 | −2.6 | −5.0 |
| | Evaluation after weatherability test | Wcie | 85.0 | 85.1 | 48.2 | 65.8 | 58.2 | 79.2 |
| | | L | 85.8 | 85.7 | 82.5 | 83.5 | 81.9 | 82.8 |
| | | a | −1.0 | −1.0 | −4.2 | −2.6 | −4.3 | −3.0 |
| | | b | −3.0 | −2.8 | 2.3 | −2.6 | 10.1 | 0.0 |
| | | Discoloration after test (ΔE) | 1.9 | 2.2 | 6.0 | 10.1 | 13.0 | 6.6 |

*titanium oxide without surface treatment was used.

The details of the cover composition are as follows.

Adiprene LW520 is $H_{12}$MDI (hydrogenated MDI)-PTMG isocyanate group-terminated urethane prepolymer, with NCO content of 4.8%, and free hydrogenated MDI content of 0.5% or more, manufactured by Uniroyal Chemical Co.;

Vibrathane B635 is MDI-PTMG isocyanate group-terminated urethane prepolymer, with NCO content of 7.8%, and free hydrogenated MDI content of 0.5% or more, manufactured by Uniroyal Chemical Co.;

Adiprene LF950A is TDI-PTMG isocyanate group-terminated urethane prepolymer with NCO content of 6.1%, and free hydrogenated TDI content of 0.1% or more;

Ethacure 100LC is 3,5-diethyltoluene diamine, amine value=630 mgKOH/g, manufactured by Albemarle Corp;

Ethacure 300 is 3,5-dimethylthiotoluene diamine, amine value=530 mgKOH/g, manufactured by Albemarle Corp;

Curehard MED is 3,3'-diethyl-5,5'-dimethyl-4,4'-diaminodiphenylmethane, amine value=398 mgKOH/g, manufactured by Ihara Chemical Industry Co., Ltd.;

the colorant contains a 50 wt. % pigment with a content ratio of titanium oxide/blue pigment/red pigment at 10:0.3:0.2, including polyether polyol as a binder, wherein the titanium oxide is a surface-treated titanium oxide "D-918" manufactured by Sakai Chemical Industry Co., Ltd., the blue pigment is a cobalt blue pigment, and the red pigment is a monoazo pigment; and the light stabilizer is bis(1,2,2,6,6-pentamethyl-4-piperidyl) sebacate sold under the trade name "Sanol LS765" manufactured by Sankyo Lifetech Co., Ltd.

The evaluation results regarding weatherability of the golf balls are as shown in Table 2.

As is obvious from Table 2, since the content of the surface-treated titanium oxide was less with respect to the golf ball No. 1 and the golf ball No. 2, UV absorbability due to addition of the surface-treated titanium oxide was insufficient, with the result that the covers of the golf balls No. 1 and No. 2 showed remarkable discoloration. The cover of the golf ball No. 4 after the weatherability test showed remarkable discoloration because the light stabilizer was not added.

The golf ball No. 9 is an example in which the content of the surface-treated titanium oxide is excessively large. The ΔE value of the cover of the golf ball No. 9 was slightly lower than the other examples. This result reveals that an excessive addition of the surface-treated titanium oxide may degrade the weatherability of a resultant golf ball. The golf balls No. 11 and No. 12 each contains, as well as a brown-colored curing agent, an isocyanate group-terminated urethane prepolymer having an aromatic isocyanate terminal group as an isocyanate component. As a result, discoloration (ΔE) of each of the covers of the golf balls No. 11 and No. 12 after the weatherability test was remarkably large despite the addition of the surface-treated titanium oxide. Since the golf ball No. 13 contains the titanium oxide without surface treatment, discoloration (ΔE) of the cover of the golf ball No. 13 after the weatherability test was large.

The golf balls Nos. 3, 5, 6, 8, and 10 are examples in which an isocyanate group-terminated urethane prepolymer having 4,4'-dicyclohexylmethane diisocyanate as an isocyanate component, an aromatic polyamine, a surface-treated titanium oxide, and a light stabilizer are contained in their respective cover composition. All the golf balls Nos. 3, 5, 6, 8, and 10 showed less discoloration after the weatherability test, and thus exhibited good weatherability. Particularly, the golf balls No. 5 and No. 6 showed less discoloration (ΔE), as compared with the golf ball No. 4 without inclusion of the light stabilizer. This result clarifies that addition of the light stabilizer remarkably improves weatherability. Although the golf ball No. 7 showed less discoloration after the weatherability test, the value ΔE of the cover of the golf ball No. 7 was slightly larger than that of the golf ball No. 6 despite the fact that the content of the surface-treated titanium oxide was the same regarding the golf balls No. 6 and No. 7. This is because the golf ball No. 7 contains a larger amount of the light stabilizer than the golf ball No. 6.

This application is based on Japanese Patent Application No. 2004-046842 filed on Feb. 23, 2004 the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A cover composition for a golf ball comprising:
   an isocyanate group-terminated urethane prepolymer containing an isocyanate component derived from at least one diisocyanate compound selected from the group consisting of 4,4'-dicyclohexylmethane diisocyanate, isophorone diisocyanate, and cyclohexane diisocyanate;
   an aromatic polyamine;
   a light stabilizer; and
   a titanium oxide applied with a surface treatment capable of suppressing photocatalytic action of the titanium oxide, wherein said cover composition contains 3 to 8 parts by mass of said surface-treated titanium oxide relative to 100 parts by mass of said isocyanate group-terminated urethane prepolymer.

2. The cover composition according to claim 1, wherein said cover composition contains polyether polyol.

3. The cover composition according to claim 1, wherein said surface-treated titanium oxide is formed on a particle surface with at least one selected from the group consisting of silicon oxide, zirconium oxide, aluminum oxide, and hydrates thereof.

4. The cover composition according to claim 1, wherein said light stabilizer is a tertiary hindered amine light stabilizer.

5. The cover composition according to claim 2, wherein said surface-treated titanium oxide is formed on a particle surface with at least one selected from the group consisting of silicon oxide, zirconium oxide, aluminum oxide, and hydrates thereof.

6. The cover composition according to claim 2, wherein said light stabilizer is a tertiary hindered amine light stabilizer.

7. The cover composition according to claim 3, wherein said light stabilizer is a tertiary hindered amine light stabilizer.

8. The cover composition according to claim 5, wherein said light stabilizer is a tertiary hindered amine light stabilizer.

9. A golf ball having a cover layer made of the cover composition of claim 1.

* * * * *